July 6, 1926.

F. S. CONNER 1,591,805

THERMOSTATIC GAS CONTROL VALVE

Filed June 8, 1925

INVENTOR.
FRANK S. CONNER.
BY
ATTORNEYS.

Patented July 6, 1926.

1,591,805

UNITED STATES PATENT OFFICE.

FRANK S. CONNER, OF PETALUMA, CALIFORNIA, ASSIGNOR TO PRIDE OF PETALUMA BROODER STOVE CO., INC., OF PETALUMA, CALIFORNIA.

THERMOSTATIC GAS-CONTROL VALVE.

Application filed June 8, 1925. Serial No. 35,559.

My invention is a thermostatic gas-control suitable for use with a gas heater or furnace. The particular object of my invention is to provide a thermostatic control which is of a rugged type and may be readily adjusted.

Another object is to provide a thermostatic control especially adapted to be used with the gas heater of a chicken brooder or hover.

My invention will be more readily understood from the following description in which:—

Figures 1, 2, 3:
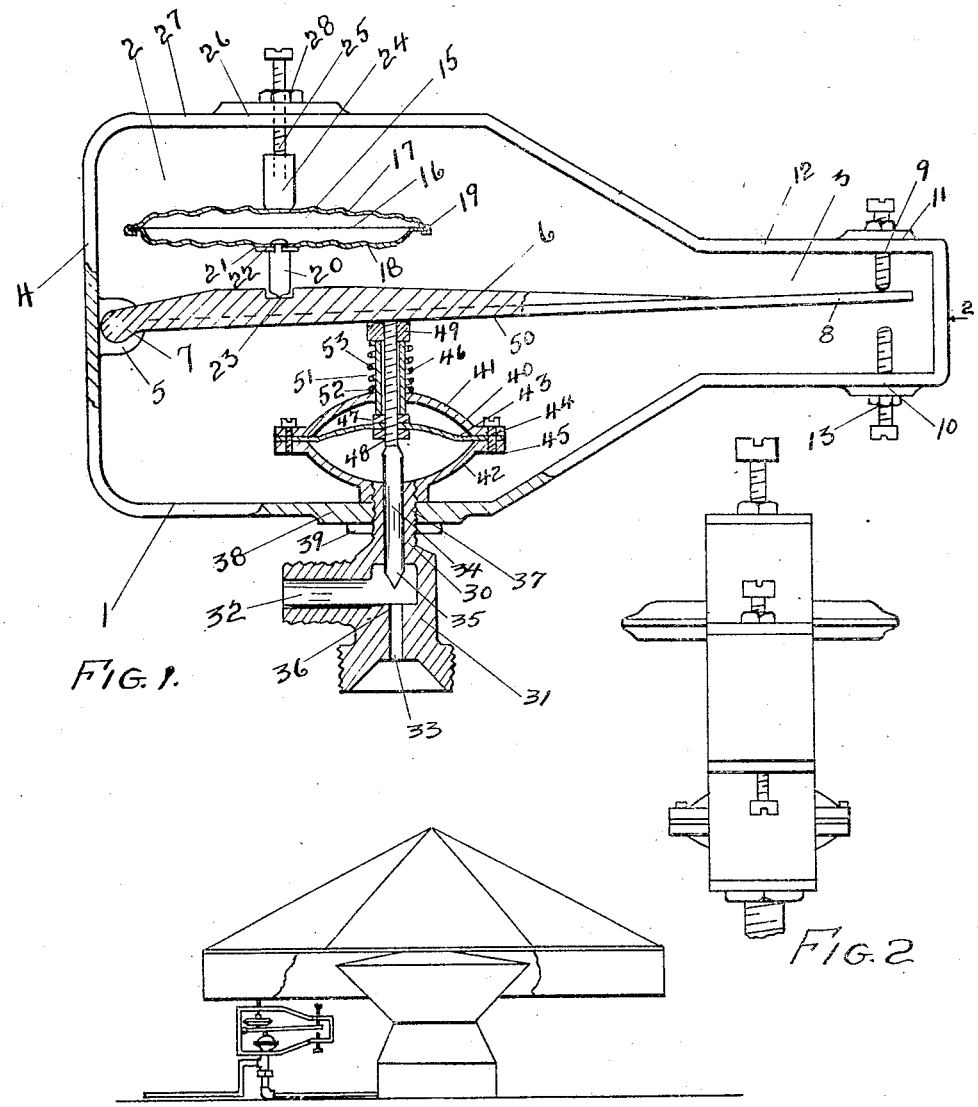
Figure 1 is an elevation partly in section of my thermostatic gas-control showing the frame, actuating lever, expansion chamber and valve details.
Figure 2 is an end view of Figure 1 in the direction of the arrow 2 on a reduced scale.
Figure 3 is an elevation showing my gas-control valve positioned to co-operate with a chicken hover and a stove to heat the hover.

Referring to Figures 1 and 2, the frame is designated generally by the numeral 1 having the main portion 2 and contracted end 3. The end wall 4 has a pair of lugs 5 formed integral therewith to which is pivoted a lever 6 by means of the pintles 7. The tip 8 of the lever is restricted in movement by upper and lower stop pins 9 and 10 which are screw threaded through similar bosses 11 in the end section 12 of the frame and retained in position by similar lock nuts 13.

The thermostatic device is indicated generally by the numeral 15 and comprises a gas expansion chamber 16 having upper and lower corrugated walls 17 and 18 seamed at the edges 19 to form a gas tight container. The lower wall has a supporting stem 20 secured thereto by a rivet 21, bearing plate 22, and soldered to form a gas tight connection. The stem fits into a socket 23 formed in the lever 6. In this manner the expansion chamber is held in proper fixed relation to the lever. An abutment block 24 bears against the upper wall of the expansion chamber and has a screw stem 25 threaded through a boss 26 on the upper arm 27 of the frame, the stem being locked by the lock nut 28. By this construction the distance of the upper wall 17 from the arm 27 of the frame may be adjusted so that on any expansion of the expansion chamber the lever 6 will be forced downwardly.

The gas valve is constructed as follows:— The gas valve is designated generally by the numeral 30 in which the valve body 31 has an inlet 32 and an outlet 33 both being screw threaded to fit gas pipes. A valve pin 34 has a tapered end 35 adapted to close the valve seat 36 of the outlet. This valve body is formed with a tubular stem 37 through which the valve pin extends and this stem is screw threaded and fastened to the lower arm 38 of the frame, being locked into position by a lock nut 39.

A diaphragm chamber 40 is constructed with upper and lower domes 41 and 42, the latter being screw threaded on the tubular stem 37 and preferably bears on the lower arm 38 of the frame. A flexible diaphragm 43 is placed there between and clamped between rims 44 by bolts 45. The valve pin is reduced in diameter and threaded at its upper portion 46 and is clamped to the diaphragm by upper and lower lock nuts 47 and 48. The upper end of the stem has a head nut 49 secured thereto and positioned to bear against the under surface 50 of the lever 6. A tubular sleeve 51 surrounds the screw threaded portion of the valve pin and extends through an enlarged aperture 52 in the upper dome 41. This sleeve is positioned between the lock nut 47 and the head nut 49. A coiled spring 53 is positioned between the upper dome and the head nut and surrounds the sleeve.

The operation of my thermostatic gas-control valve is as follows:—in assembly of the diaphragm chamber the valve pin will be adjusted in the proper position in the diaphragm relative to the valve body and the head nut 49 which is made of considerable length is adjusted on the valve pin to allow the diaphragm to have the desired movement. The main function of the diaphragm is to form a gas tight fitting so that no packing will be required on the valve pin 34 in order that this pin will slide freely to open or close the valve by the changing position of the tapered end 35 relative to the seat 36. The head nut 49 will be adjusted on the threaded end 46 of the valve pin so as to locate the diaphragm and valve pin in the desired position. The stop pins 9 and 10 will then be adjusted so as to give the desired range of action to the lever 6 and the abutment block 24 will be adjusted into the proper position in relation to the expansion chamber when the lever is up, that is, when the valve 30 is wide open, lever 6 will be held elevated by the coiled spring 53.

This will result in the heater operating at its maximum capacity, which will raise the temperature of the air in the brooder and cause the gas in chamber 16 to expand. The corrugated walls 17 and 18 will be forced apart thereby depressing the lever 6 and forcing the valve pin 34 downwardly, gradually closing the gas passage to the desired extent. It will thus be seen that my thermostatic control will operate to increase or decrease the amount of gas in accordance with the changing external temperatures and that this control will respond to small variations in temperature. This latter feature is necessary in regard to its use with a chicken hover so that the chicks will have the proper temperature within close limits.

It is apparent that my thermostatic gas control can be considerably modified in general construction and in details to suit special circumstances or requirements without departing from the spirit thereof.

Having described my invention what I claim is:—

1. A gas regulating device comprising a frame, a lever pivotally connected thereto, an expansion chamber positioned between said frame and said lever, a gas line having a valve seat therein, a reciprocating pin adapted to engage said seat, said pin being attached to said lever to move therewith, and a diaphragm attached to said pin.

2. A gas regulating device comprising a frame, a lever pivotally mounted therein, an expansion chamber positioned between said frame and said lever, a gas line having a valve seat therein, a reciprocating pin attached to said lever and adapted to cooperate with said valve seat to regulate the flow of gas through said gas line, a dome surrounding said pin and a diaphragm fitting over said dome and secured to said pin to thereby form a gas tight chamber.

In testimony whereof I affix my signature.

FRANK S. CONNER.